Sept. 6, 1932.  J. VAN DUZER  1,876,478
FISHING ROD SUPPORT
Filed Dec. 3, 1930

INVENTOR
Joseph Van Duzer
BY
ATTORNEYS

WITNESSES

Patented Sept. 6, 1932

1,876,478

UNITED STATES PATENT OFFICE

JOSEPH VAN DUZER, OF FIRTHCLIFFE, NEW YORK

FISHING ROD SUPPORT

Application filed December 3, 1930. Serial No. 499,818.

This invention relates generally to the class of supports, and refers with more particularity to a support for fishing rods, whereby the rod may be conveniently supported from the gunwale of a boat or the like or from the ground defining the shore of a body of water.

The invention primarily aims to provide an improved support of the indicated character, by virtue of which an angler is provided with means for supporting a fishing rod, whereby said rod may be readily associated with or removed from the support, and which rod when supported by said device, is maintained in a proper position to permit of free turning of the reel.

More specifically, the invention comprehends a support of the character set forth including means which will selectively function as a clamp for detachably associating the device with the gunwale of a boat or for anchorage in the ground forming the bank or shore of a body of water.

The invention furthermore resides in the provision of an improved fishing rod support, which comprises few and simple parts, capable of being economically produced and assembled and affording a device which is highly efficient in its purpose.

With the above recited and other objects in view, reference is had to the following description and accompanying drawing, in which there is exhibited one example or embodiment of the invention, while the claims define the actual scope of the same.

Figure 1:
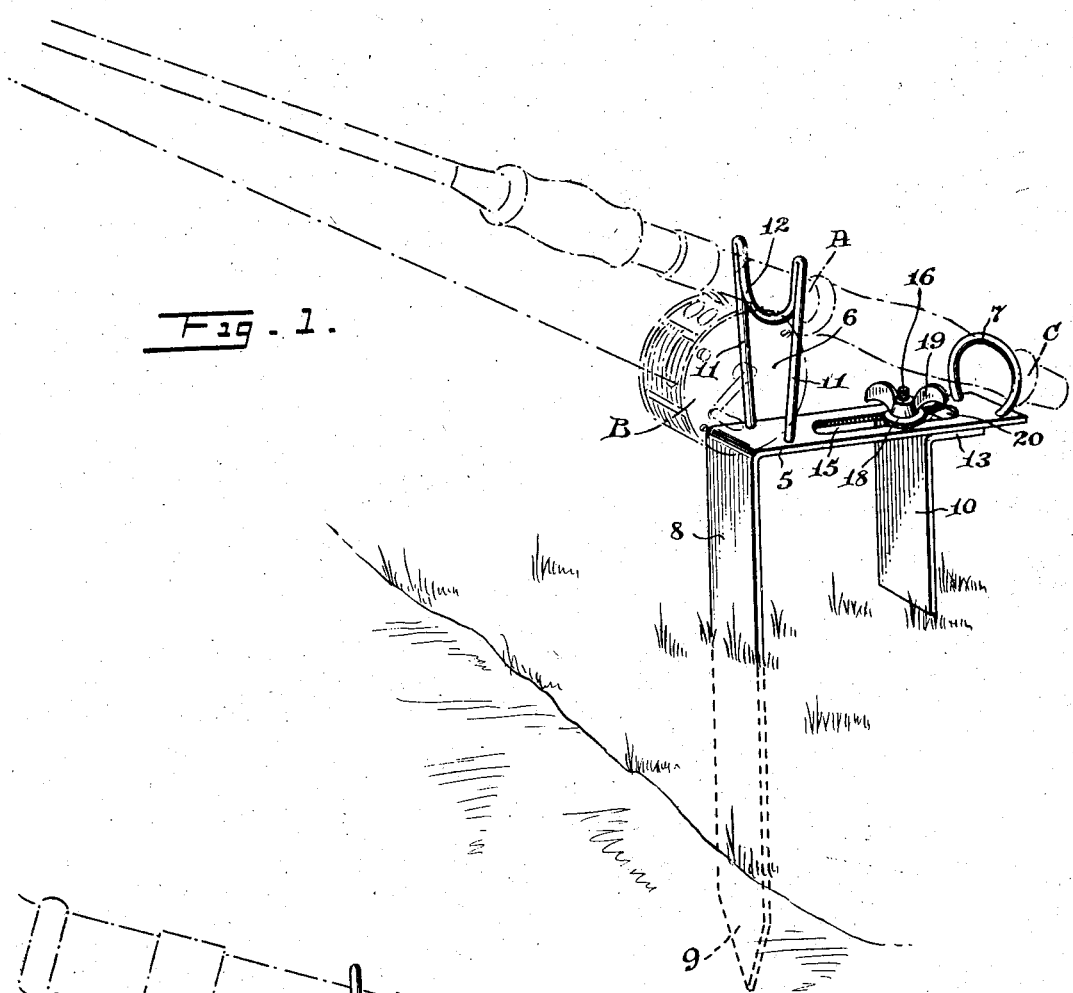
Figure 1 is a perspective view of the supporting device in its active use for supporting a fishing rod by the ground.

Referring to the drawing by characters of reference, the device includes a substantially horizontal strap or member 5 provided adjacent its opposite ends with upstanding front and rear rod butt receiving elements 6 and 7 which are fashioned in such a manner as to hold the rod at an inclination. The device further includes a fixed depending forward element 8, which is preferably, although not necessarily, formed integral with the horizontal strap or member 5, and which element 8 is provided with a pointed or sharpened lower end 9 to facilitate the insertion of the same into the ground. The device further comprises a second, what will be termed, rear depending element 10 which is suitably carried by the horizontal strap or member 5 for adjustment toward and away from the front depending element 8. As specifically illustrated, the upstanding forward element 6 is fashioned from a length of wire to provide transversely spaced legs 11 anchored at their lower ends to the horizontal strap or member 5 and joined at their upper ends by an integral U-shaped bight 12 which presents a rod butt rest which is open at the top and within which U-shaped bight the rod butt A is adapted to be seated with the reel B in depending relation engaging the legs 11 to act as a stop for limiting the rearward movement of the rod, as clearly illustrated in the drawing. The rear upstanding element 7, as shown, is preferably constructed of wire of approximately semicircular form, with the extremities thereof anchored at transversely spaced points to the horizontal strap or member 5 to define a bail, through which the heel portion C of the rod butt is extended and by which said heel portion is embracingly engaged to prevent lateral or vertical displacement of the rod from the supporting device while permitting of its ready association or disassociation with the supporting device by a direct axial movement.

As specifically illustrated, the movable or adjustable rear depending element 10, which is preferably of strap metal, is formed with an angularly bent horizontally disposed upper end 13 which directly underlies and extends longitudinally of the horizontal strap or member 5. The end 13 is formed with an aperture 14 disposed in alignment with a longitudinal slot 15 formed in the horizontal strap or member 5, which aperture and slot receive therethrough the threaded bolt shank 16 having a squared head 17 at its lower end, The aperture 14 is disposed in close enough proximity to the depending portion of the element 10, whereby one of the bolt faces engages therewith to prevent rotation of the bolt when thus applied. The upwardly protruding portion of the threaded bolt shank 16 receives thereover a washer 18 and a wing nut 19, by virtue of which the element 10 may be secured in various relatively adjusted relations to the fixed depending front element 8. In order to prevent accidental turning movement of the element 10 with reference to the strap or member 5, the free terminal of the end 13 is slitted inwardly along lines parallel to the side walls of the slot 15, and the portion defined between said slits is bent upwardly to afford a finger 20 which engages within the slot for the purpose specified.

When the device is employed for the purpose of supporting a fishing rod by the ground constituting the shore or bank of a body of water, as illustrated in Figure 1, the sharpened or pointed lower extremity 9 of the depending element 8 is forced vertically into the ground and the depending element 10 is preferably adjusted rearwardly to function as a means for limiting the insertion of the element 8 into the ground and as a brace engaging the ground surface. With the device in this position, it is apparent that the rod may be readily supported as disclosed in Figure 1, while the angler may instantly remove the rod from the device for the purpose of playing a fish.

Figure 2:
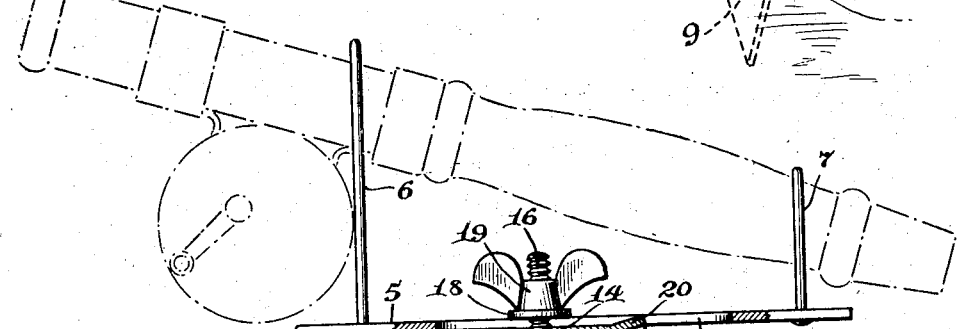
Figure 2 is an enlarged side view of the device with parts shown in section and illustrating its association with the gunwale of a boat or the like and in active use.

In its alternative use for supporting the rod from the gunwale of a boat or analogous support, the depending forward element 8 acts in the capacity of a fixed jaw on the horizontal strap or member 5, while the second rear depending element 10 serves as an adjustable jaw for clamping or engaging the gunwale D of a boat or equivalent element, as clearly disclosed in Figure 2 of the drawing.

While there has been illustrated and described a single and preferred embodiment of the invention, it is to be clearly understood that this disclosure is not intended as a limitation of the invention, but that variations, modifications and equivalents which fall within the range of the appended claims may be resorted to when desired.

What is claimed is:

1. A device of the character set forth including a horizontal member and a vertical depending member at one end thereof, said members being fashioned from a length of strap material and the depending member having a pointed lower end, upstanding fishing rod supporting means on the horizontal member and a depending strap-like element carried by the horizontal member for longitudinal adjustment thereon with respect to the first mentioned depending member, said latter member having an angularly bent upper end underlying the horizontal member, said horizontal member having a longitudinal slot, said upper end having an aperture registering therewith and a bolt extending through said aperture and slot, for retaining the latter member in its adjusted positions.

2. A device of the character set forth including a horizontal member and a vertical depending member at one end thereof, said members being fashioned from a length of strap material and the depending member having a pointed lower end, upstanding fishing rod supporting means on the horizontal member and a depending strap-like element carried by the horizontal member for longitudinal adjustment thereon with respect to the first mentioned depending member, said latter member having an angularly bent upper end underlying the horizontal member, said horizontal member having a longitudinal slot, said upper end having an aperture registering therewith and a bolt extending through said aperture and slot, for retaining the latter member in its adjusted positions and means on said adjustable member coacting with the horizontal member for preventing turning movement of the adjustable member.

3. A device of the character set forth including a horizontal member and a vertical depending member at one end thereof, said members being fashioned from a length of strap material and the depending member having a pointed lower end, upstanding fishing rod supporting means on the horizontal member and a depending strap-like element carried by the horizontal member for longitudinal adjustment therewith respect to the first mentioned depending member, said latter member having an angularly bent upper end underlying the horizontal member, said horizontal member having a longitudinal slot, said upper end having an aperture registering therewith and a bolt extending through said aperture and slot, for retaining the latter member in its adjusted positions and means on said adjustable member coacting with the horizontal member for preventing turning movement of the adjustable member, said means consisting of an upwardly offset finger engaging within the slotted portion of the horizontal member.

JOSEPH VAN DUZER.